United States Patent [19]

Steiger

[11] 4,232,522

[45] Nov. 11, 1980

[54] METHOD AND APPARATUS FOR UTILIZING WASTE HEAT FROM A FLOWING HEAT VEHICLE MEDIUM

[75] Inventor: Anton Steiger, Illnau, Switzerland

[73] Assignee: Sulzer Brothers Limited, Winterthur, Switzerland

[21] Appl. No.: 4,883

[22] Filed: Jan. 19, 1979

[30] Foreign Application Priority Data

Jan. 3, 1978 [CH] Switzerland ............... 2196/78

[51] Int. Cl.³ .............. F01K 23/08; F01K 23/10
[52] U.S. Cl. ............................... 60/618; 60/599; 237/13
[58] Field of Search ............... 60/39.18 B, 618, 670, 60/676, 599; 165/51; 237/12.3 B, 13

[56] References Cited

U.S. PATENT DOCUMENTS

| 2,717,491 | 9/1955 | Barr | 60/39.18 B |
| 4,170,879 | 10/1979 | Laing et al. | 60/39.18 B |

FOREIGN PATENT DOCUMENTS

| 2625745 | 12/1977 | Fed. Rep. of Germany | 60/618 |
| 2752283 | 3/1979 | Fed. Rep. of Germany | 60/618 |

Primary Examiner—Michael Koczo
Attorney, Agent, or Firm—Kenyon & Kenyon

[57] ABSTRACT

A method and apparatus for the utilization of the waste heat of diesel engines, in which the waste heat is utilized in at least one vapor circuit to produce mechanical energy. To improve the waste heat utilization, the engine media containing the waste heat—e.g. the boost air and the exhaust gases—have heat additionally withdrawn from them during the pre-heating of the liquid working medium for the vapor circuit. The heat withdrawal is effected by liquid working medium from a heating system which is disposed in parallel relationship to the vapor circuit. The liquid working medium is introduced into the vapor circuit upstream of the pre-heater and is separated downstream thereof from the working medium which is to be evaporated.

7 Claims, 5 Drawing Figures

METHOD AND APPARATUS FOR UTILIZING WASTE HEAT FROM A FLOWING HEAT VEHICLE MEDIUM

This invention relates to a method and apparatus for utilizing waste heat from a flowing heat vehicle medium. More particularly, this invention relates to a method and apparatus for utilizing the waste heat from a heat vehicle medium utilized in a diesel engine.

Heretofore, it has been known to use the waste heat of a diesel engine, for example as described in Swiss Pat. No. 586,349, by extracting some of the heat of the waste gases and/or cooling water by means of one or more vapor circuits. In such cases, the engine waste heat is generally used to evaporate and, in some cases, superheat the working medium of one or all of the vapor circuits at different pressure or temperature levels. The vapor is then expanded in one or more turbines and performs mechanical work during expansion.

It has also been proposed to provide an additional similar circuit for recovery of the boost air compression heat which is used in a boost air cooler which may be provided in some cases. This proposal also suggests providing a heatconsuming device, e.g. for use in space heating, in at least one of the vapor circuits. Such a proposal is described in Swiss Patent Application 14719/77.

In plants having an additional heat consuming device in the vapor circuit, some of the total heat usable therein is withdrawn from the circuit and hence from the generation of relatively high-grade mechanical energy, and is consumed as relatively low-value heating energy. Further, the waste heat can be recovered only incompletely from the other plants noted above, particularly those using gaseous heat vehicle media, if the expenditure for the necessary heat exchangers and the gas piping is to be acceptable. This disadvantage, which is striking particularly in plants having a relatively low temperature and pressure level limited by the waste heat available, can be explained by reference to the graph in FIG. 5.

The y-axis of this graph, which is plotted in arbitrary units, shows the temperatures t, while the x-axis shows the quantities of heat Q, for example for recovery of the compression heat from the boost air of a diesel engine by means of a vapor circuit. The design in respect of the pressure is determined by the fact that there is an adequate temperature gradient for an effective heat transfer or heat flow between the heat-yielding gas (temperature curve a) and the heatabsorbing working medium (temperature curve b) at the pinch point P and P'. The amount of working medium circulating through the vapor circuit is determined by the fact that the waste heat $Q_v$ available between the pinch point and the end of evaporation must at least be sufficient to convert to saturated steam the amount of working medium preheated to the evaporation temperature $t_3$. The boost air is cooled from an initial temperature $t_1$ to the temperatures $t_2$ during evaporation of the working medium as a result of the heat required for this evaporation.

Since the energy required for evaporation, particularly of water, is very high in relation to that required for preheating the water to the evaporation temperature $t_3$, only a relatively small quantity of working medium can circulate in the power-generating circuit. The preheating of this quantity of liquid working medium from its condensate temperature $t_6$ to the evaporation temperature $t_3$ therefore requires only a relatively small amount of heat $Q_s$. This is shown by the broken-line curve c in FIG. 5. This preheating, at the same time, results in the gas on the primary side being cooled only to an intermediate temperature $t_4$.

Since the heat-yielding gas could be cooled to a temperature $t_5$, taking into account an adequate temperature gradient for economically viable heat transfer from the gas on the primary side to the vapor circuit condensate, a quantity of heat $Q_z$ flows out of the system unused in the prior-art system described with the inadequately cooled gas. Thus, the energy recovery is defective.

Accordingly, it is an object of the invention to improve the energy recovery in diesel engines by means of powerproducing vapor circuits.

It is another object of the invention to extract more heat from gaseous waste heat vehicles than was heretofore possible using conventional means.

It is another object of the invention to provide a relatively simple means for utilizing the waste heat of a heated heat vehicle associated with a diesel engine.

Briefly, the invention provides a method and apparatus for utilizing waste heat of a flow of a heated heat vehicle.

In accordance with the method, a flow of a heat vehicle medium, for example as utilized in a diesel engine, is passed into heat exchange relation with a flow of a working medium of at least one power circuit. The power circuit through which the working medium is circulated is constructed as a vapor circuit to effect pre-heating, at least partial evaporation, expansion and condensation of the working medium. In addition, an additional quantity of a liquid working medium from a heating circuit is introduced into the power circuit prior to the preheating of the working medium and discharged from the power circuit after pre-heating to at least one heat consuming means.

With this method, the amount of working medium preheated by the waste heat of the engine (temperature curve d FIG. 5) is multiplied in relation to the amount circulating in the vapor circuit. Thus, the amount of heat withdrawn from the waste heat vehicle during pre-heating is increased by the value $Q_z$ (FIG. 5). This additionally recovered energy is preferably utilized for heating purposes. It is not withdrawn from the energy utilized as power as is the case in previous plants having a heat consuming means in the actual vapor circuit. Further, this withdrawal of heat does not have an adverse effect on the energy which can be made available for the vapor circuit, because, as explained above, this heat cannot be utilized therein. This heating energy, which is used, for example, for space heating or for bunker heating on ships, is therefore freely available as compared with what occurs with the prior-art plant, without consuming fuel or making it necessary to accept a reduction of the amount of vapor for power generation.

The apparatus is comprised of a heat exchanger for conveying the flow of heated heat vehicle medium, a vapor circuit for passing a flow of working medium into heat exchange with the heat vehicle in the heat exchanger, and a heating system. The vapor circuit includes at least one pre-heater in the heat exchanger, an evaporator in the heat exchanger, an expansion means for performing work, a condensor and a pump. The heating system is connected to the pre-heater in parallel to the vapor circuit and includes at least one heat consuming means.

In the plants discussed above, in which a number of vapor circuits having different pressure and temperature levels are provided, the plant can be simplified and its cost reduced if at least individual preheaters of the power and heating systems are connected in series with respect to part of the working medium flow, the heating system is disposed in parallel to this partial series circuit, and means such as adjustable throttle means and/or variable-delivery means for the flow of working medium are provided to distribute the working medium to the different systems.

These and other objects and advantages of the invention will become more apparent from the following detailed description and appended claims taken in conjunction with the accompanying drawings in which:

FIG. 1 diagrammatically illustrates an apparatus according to the invention;

FIG. 2 diagrammatically illustrates a modified apparatus according to the invention;

Figure 1:
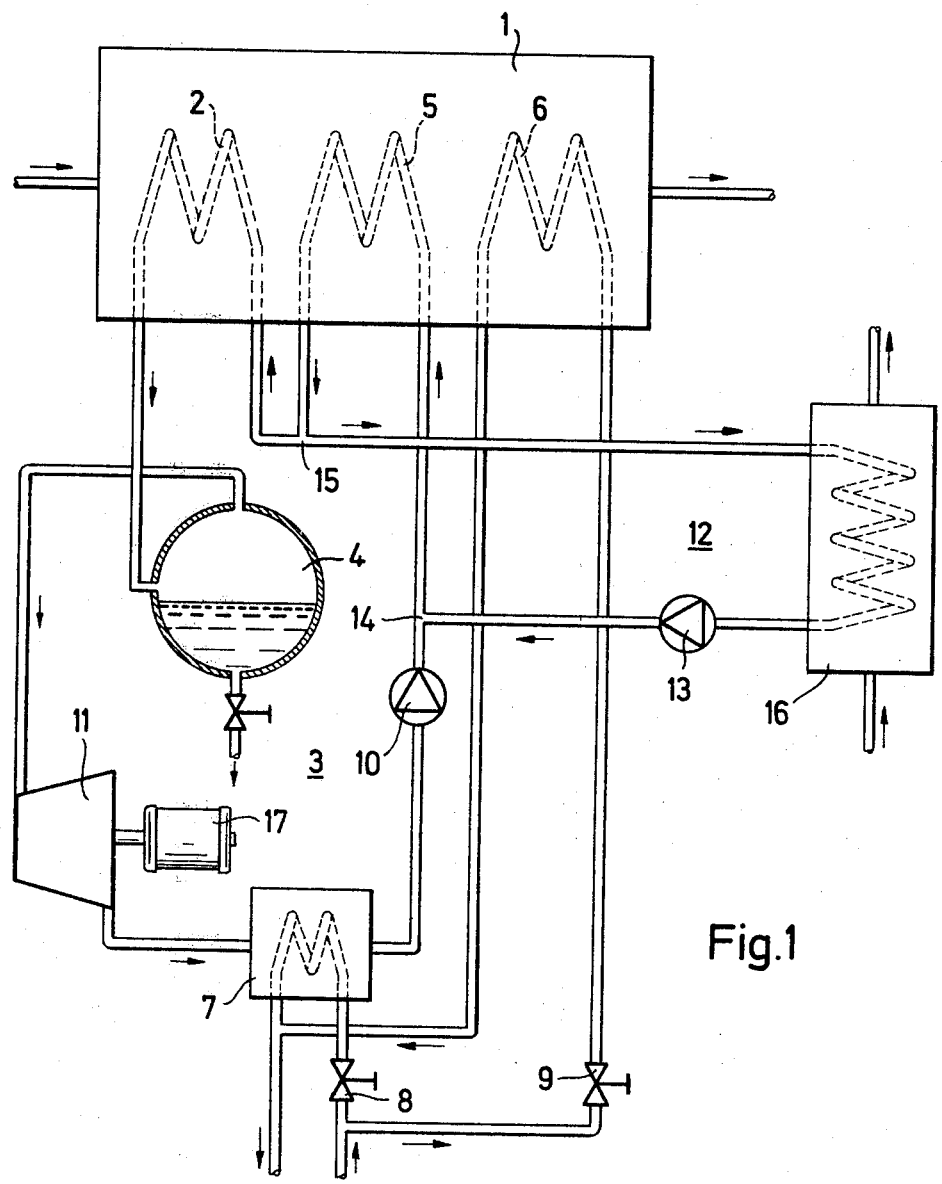

Referring to FIG. 1, the apparatus for utilizing waste heat in a flow of heat vehicle medium, for example the waste heat in a flow of compressed boost air for a diesel engine, includes a heat exchanger 1 and a power circuit 3 through which a working medium circulates. The heat exchanger 1 is constructed such that the heat vehicle medium, from which the maximum amount of heat is to be withdrawn, flows from left to right through the primary side of the heat exchanger as shown by arrows. In this embodiment, the compression heat must be withdrawn as far as possible when the air enters the diesel engine (not shown).

The heat to be withdrawn from the boost air is dissipated via three different heat-exchanger surfaces 2, 5, 6 on the secondary side, through which different media or different quantities of one medium flow. One heat-exchanger or heating surface 2 which serves as a direct or indirect evaporator is the first one in the direction of the boost air flow. This heating surface 2 is part of the power circuit 3 which is constructed as a vapor circuit 3 and serves to either evaporate or heat the working medium to such an extent that the working medium can be evaporated by expansion in a vessel 4 or to cause a third medium to evaporate via another heat-exchanger.

The second heat exchanger surface 5 serves as a preheater so that the working medium of the vapor circuit 3, generally water, is pre-heated at least approximately to its evaporation temperature. As shown, the pre-heater 5 is disposed in the heat exchanger 1 after the surface 2 as considered in the direction of flow of the boost air through the heat exchanger 1.

The third heat-exchanger surface surface 6 has a coolant flowing through the secondary side instead of the working medium of the vapor circuit 3. Further, on the secondary side, the cooler 6 is disposed, for example, in parallel to a cooling water system which dissipates the condensation heat from a condensor 7 of the vapor circuit 3, the flow being divided up between the two by adjustable throttle means 8, 9. The purpose of the cooler 6 is to effect additional non-recoverable heat withdrawal from the boost air if the latter cannot be cooled in the optimum manner for the engine by means of the procedure according to the invention.

The vapor circuit 3 is completed by a pump 10 and an expansion means such as a turbine 11 which produces work to drive a generator 17.

In addition, a heating system 12 is connected in parallel with the power circuit or system 3, with respect to the pre-heater 5, and the same liquid working medium as in the circuit 3 flows through the system 12 by means of a pump 13. The working medium from the heating system 12 is introduced into the circuit 3 at point 14 and is divided up over the two systems 3, 12 at point 15. The division of the working medium is determined by the design of the two systems 3, 12 in respect of flow resistances and delivery of the pumps 10, 13 in the systems 3, 12. In all the exemplified embodiments, the design and delivery of the pumps are designed for optimum waste-heat utilization at full-load engine power. To simplify the systems, the pumps are not controllable for part-load operation but are adjusted once and for all.

The working medium which is separated from the vapor circuit 3 and which, in very many cases, is many times greater than the quantity left therein, flows through a heat exchanger 16 of the heating system 12 as the primary medium, i.e. the heat-yielding medium. The secondary medium of the heat-exchanger 16 is used for heating purposes, e.g. for space heating or, on ships, for bunker heating.

Figure 2:
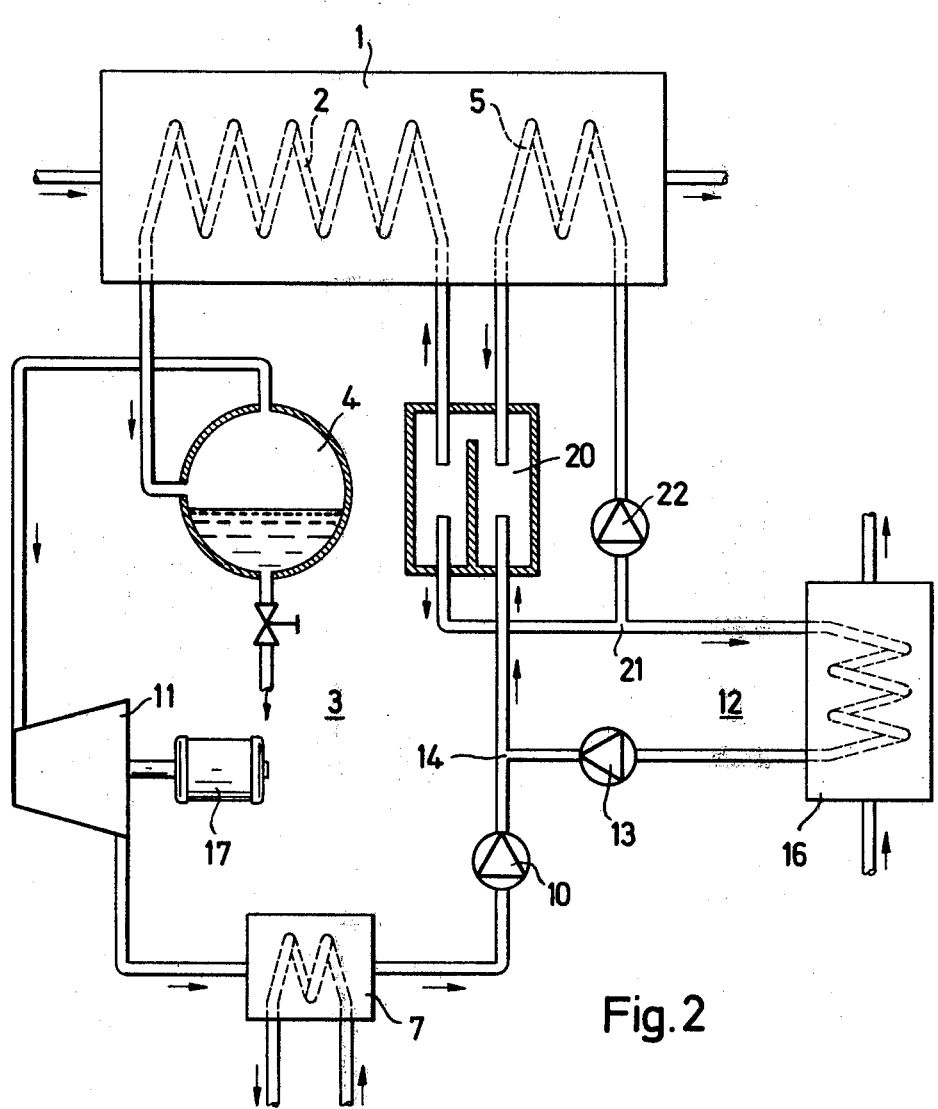

Referring to FIG. 2, wherein like reference characters indicate like parts as above, the apparatus may also be constructed without a cooler 6 as in the embodiment of FIG. 1. In this case, the working medium flows from the two systems 3, 12 are combined at a common point 14 and fed jointly to a mixer 20, into which the working medium heated up by the pre-heater 5 is also introduced. As shown, the mixer 20 has one inlet for receiving working medium from the circuit 3 upstream of the preheater 5 and downstream of the branch point 14, a second inlet for receiving working medium from the pre-heater 5, one outlet for discharging working medium to the heating system 12 and a second outlet for discharging working medium to the evaporator 2. In operation, the quantity of working medium required in the vapor circuit 3 flows from the mixer 20 to the heat-exchanger surface 2, while the remaining working medium passes to a branch point 21 and is distributed to the pre-heater 5 and the heat-exchanger 16 according to the delivery of an additional pump 22. Since the working medium leaves the mixer 20 at a lower temperature than the temperature at point 15 in the first example (FIG. 1), all other conditions remaining equal, the heat transfer in surface 2 is improved by the higher temperature gradient available. Thus, the entire heat-exchanger surface can be kept smaller as compared with the exemplified embodiment according to FIG. 1, for the same heat dissipation from the boost air.

Figure 3:
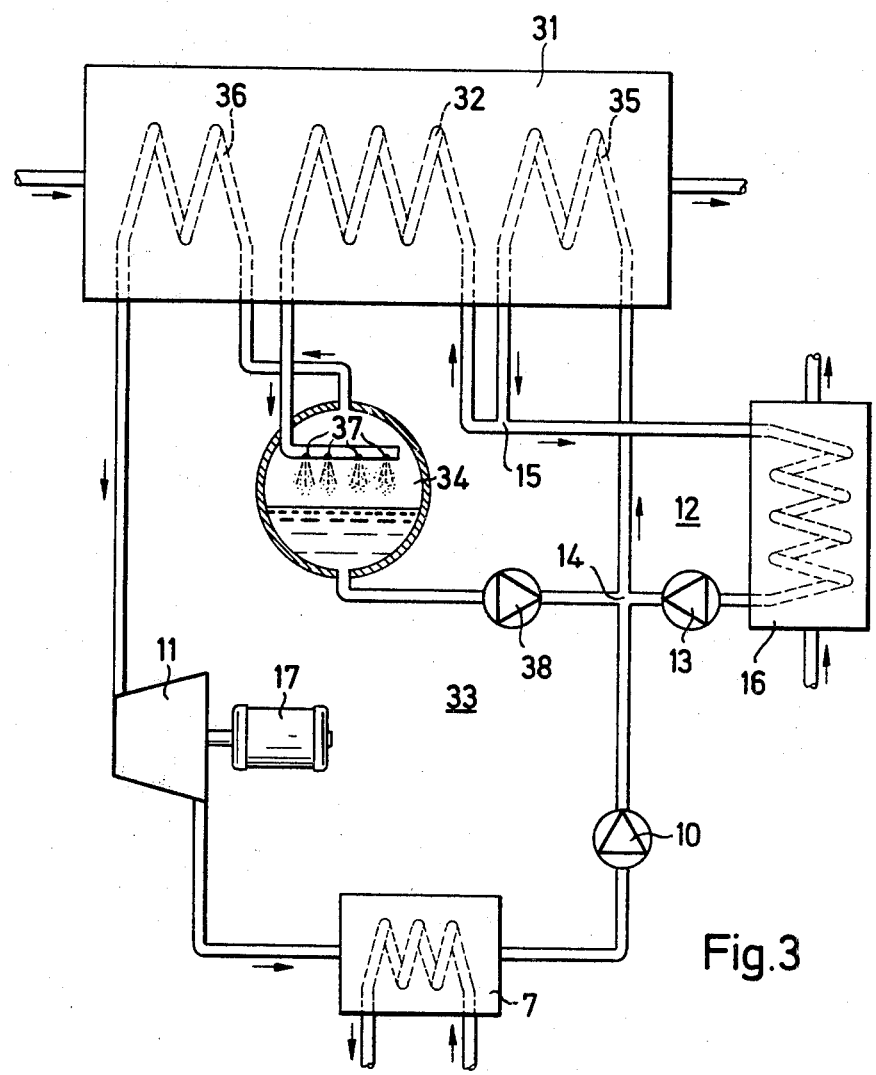
FIG. 3 illustrates an apparatus according to the invention which is heated by engine exhaust gases and in which superheated vapor is generated and utilized.

Referring to FIG. 3, wherein like reference characters indicate like parts as above, the waste heat of the exhaust gases from a diesel engine may also be utilized. To this end, the apparatus employs a heat exchanger 31 which receives the much hotter exhaust gases from the engine on the primary side. The vapor circuit 33 fed with energy therefrom is therefore at a much higher pressure and temperature level in its vapor zone than the vapor circuit 3 of FIGS. 1 and 2. As shown, the vapor circuit 33 includes three heating surfaces 36, 32, 35 in the heat exchanger 31 a turbine 11, condensor 7, pump 10 and separating vessel 34. The first heating surface 36 in the flow of exhaust gas serves as a superheater and is located downstream of the vessel 34 containing saturated vapor and upstream of the turbine 11. The primary side of the super-heater 36 is disposed upstream of the heat-exchanger or heating surface 32 as considered in the direction of flow of the exhaust gases in the heat exchanger 31.

The working medium coming from point 15 and circulating in the vapor circuit 33 is only partially evaporated in the heating surface 32 so that a vapor/water mixture is injected into the vessel 34 via nozzles 37. As a result of the residual moisture remaining from just partial evaporation in the heat-exchanger surface 32, the heat transfer to the working medium is improved while any anti-corrosion agents added are prevented from lodging on the dry walls of the exchanger surface 32. Consequently, as a result of the remaining moisture, any anti-corrosion agents separating from the vapor dissolve again and are washed off from the walls.

The water chamber of the vessel 34 is connected to the flow of working medium at the entry to the preheater 35 via a circulating pump 38 which is intended to compensate for the pressure losses in the circulation systems 35, 32, 34.

The main object of adding water from the vessel 34 is to keep the temperature of the working medium above a necessary minimum value (to avoid corrosion on the gas side) at the entry to the pre-heater 35. Also, this water circulation means that the exchanger surface 32 always has sufficient liquid working medium available to ensure the residual moisture necessary therein.

The heating system 12 receives working medium from the branch point 15 and, after extracting heat therefrom in the heat consuming means 16, recirculates the working medium to the point 14 via a pump 13.

The division of the working medium at the branch point 15 is again determined by the delivery of the pumps 10, 13 and 38. This delivery is adapted to the full-load of the engine.

Figure 4:
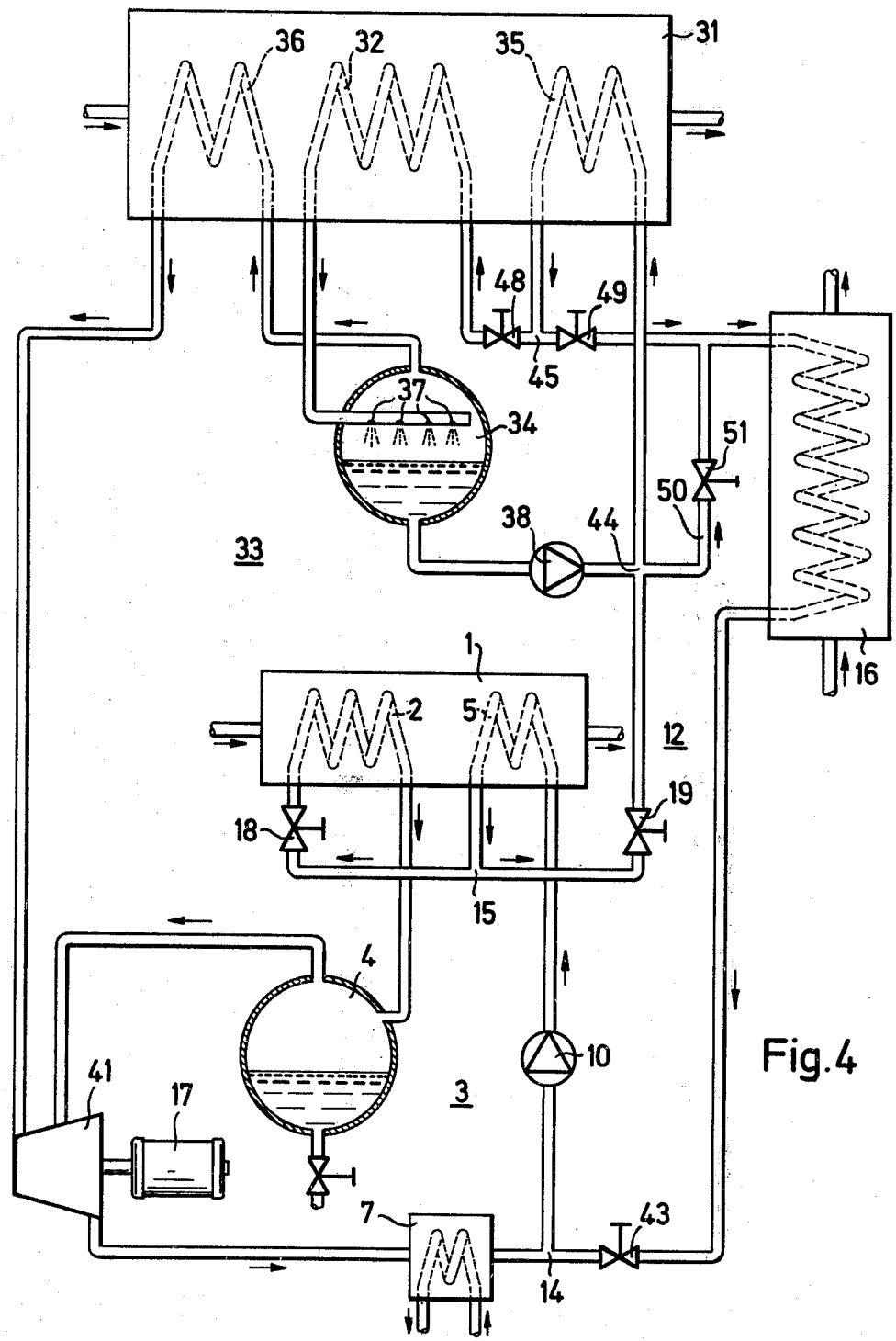
FIG. 4 illustrates an apparatus according to the invention with two different vapor circuits at different pressure and temperature levels.
Figure 5:
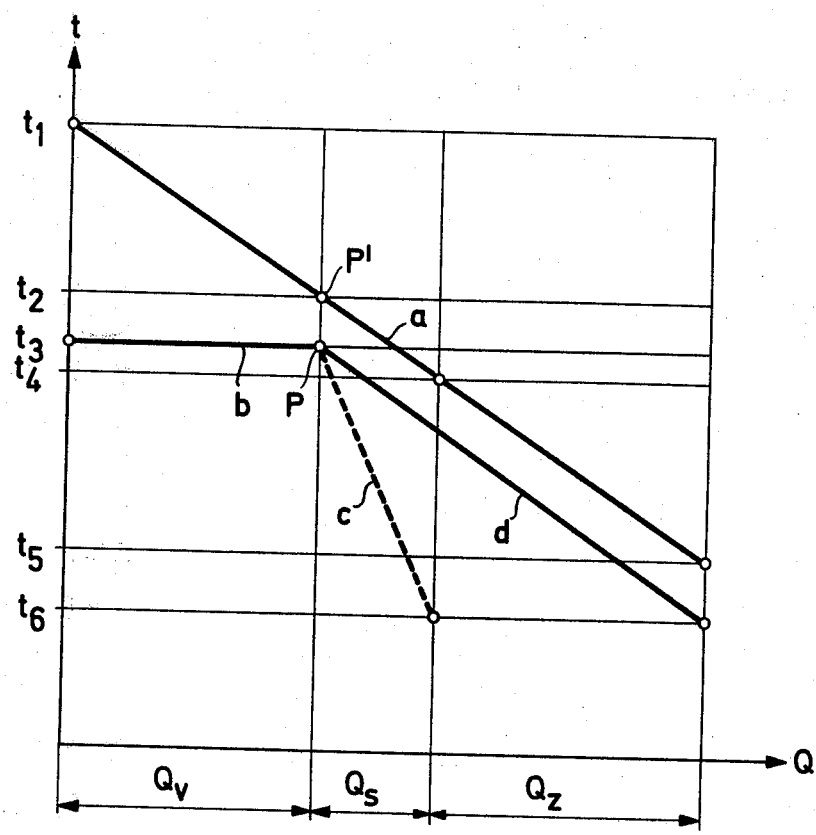
FIG. 5 illustrates a temperature/heat flow graph.

Referring to FIG. 4, wherein like reference characters indicate like parts as above, the apparatus may also be constructed such that a boost air heated vapor circuit 3 having a low pressure and temperature level—similar to the one shown in FIG. 2—and an exhaust gas heated vapor circuit 33 at higher pressure and higher temperature are combined with one another. In this case, the turbine 41 in which the vapor from the circuit 3 is introduced at an intermediate point at suitable pressure, the condenser 7 and the feed pump 10 are common to the two circuits 3, 33.

Apart from the relatively small quantity of water circulating through elements 35, 32 and 34 by means of the pump 38, the pump 10 delivers all the working medium from the three systems 3, 33 and 12 to the pre-heater 5 initially. The quantity of working medium required in circuit 3 is withdrawn at point 15 while the rest flows to an inlet and branch point 44, where, on the one hand, the circulation water (as described in connection with FIG. 3) is added from vessel 34 to the stream flowing to the preheater 35, and, on the other hand, some of the flow is withdrawn and fed via a bypass 50 directly into the heating system 12 and is controlled by an adjustable throttle means 51. As shown, the pre-heaters 5, 35 are connected in series relative to a part of the working medium flow to define a partial-series circuit in parallel with the heating system 12. The heat withdrawn from the exhaust gases in the pre-heater 35 can be limited by means of the bypass 51, again in connection with corrosion.

The main flow of working medium then passes through preheater 35 to a branch point 45, where the quantities required for the vapor circuit 33 and for the heating system 12 are separated from one another and fed to the heat-exchangers 32 and 16.

The increased pressure and circulation in the combined system are produced solely by the pump 10, for which purpose the point 14 where the liquid working medium from the heating system 12 enters the system of the vapor circuits 3, 33 is disposed on the intake side of the pump 10. Distribution to the different branch points 15 and 45 is effected by means such as adjustable throttle means 18 and 19; 48 and 49 respectively, while a back-pressure throttle means 43 is used instead of a pump in the heating system 12 upstream of the entry point 14 in order to reduce the relatively high pressure.

Of course, the method and apparatus is not limited to the exemplified embodiments described. More particularly, the method and apparatus are not confined to heat recovery in diesel engines or to the use of gaseous heat vehicle media on the primary side of the heat exchangers 1 and 31, although the method and apparatus are particularly advantageous for such media because the method and apparatus enable the heat to be withdrawn from them without any appreciable increase in the size of the heat-exchanger surfaces.

What is claimed is:

1. A method of utilizing waste heat of a diesel engine, said method comprising the steps of
   passing a flow of a heat vehicle medium utilized in a diesel engine into heat exchange relation with a flow of a working medium of at least one power circuit;
   circulating the working medium through the power circuit to effect pre-heating, at least partial evaporation, expansion and condensation thereof;
   introducing an additional quantity of a liquid working medium from a heating circuit into the power circuit prior to said pre-heating; and
   discharging the liquid working medium from the power circuit after said pre-heating to at least one heat consuming means.

2. An apparatus for utilizing waste heat of a diesel engine, said plant comprising
   a heat exchanger for conveying a flow of a heated heat vehicle medium utilized in a diesel engine therethrough;
   a vapor circuit for passing a flow of a working medium into heat exchange with the heat vehicle medium in said heat exchanger, said circuit including at least one pre-heater in said heat exchanger, an evaporator in said heat exchanger, an expansion means for performing work, a condensor and a pump; and
   a heating system connected to said pre-heater in parallel to said vapor circuit, said heating system including at least one heat consuming means.

3. An apparatus as set forth in claim 2 which further comprises at least two heat exchangers for conveying a flow of a heated heat vehicle medium therethrough; at least two vapor circuits of different pressure and temperature levels, each vapor circuit having a pre-heater and an evaporator disposed in a respective one of said heat exchangers, each said pre-heater being connected in series with the other pre-heater relative to a part of the working medium flow to form a partial-series circuit in parallel with said heating system; and means for distributing the working medium to said circuits and said heating system.

4. An apparatus as set forth in claim 3 wherein said latter means includes at least one of adjustable throttle means and variable delivery means.

5. An apparatus for extracting waste heat from a heat vehicle medium, said apparatus comprising
   a heat exchanger for conveying a flow of the heat vehicle medium therethrough;
   a vapor circuit for passing a flow of a working medium into heat exchange with the heat vehicle in said heat exchanger, said circuit including at least one pre-heater in said heat exchanger, an evaporator in said heat exchanger, an expansion means for performing work, a condensor and a pump; a heating system connected to said pre-heater in parallel to said vapor circuit; and a cooler in said heat exchanger downstream of said pre-heater for cooling the flow of heat vehicle medium.

6. An apparatus for extracting waste heat from a heat vehicle medium, said apparatus comprising
   a heat exchanger for conveying a flow of the heat vehicle medium therethrough;
   a vapor circuit for passing a flow of a working medium into heat exchange with the heat vehicle in said heat exchanger, said circuit including at least one pre-heater in said heat exchanger, an evaporator in said heat exchanger, an expansion means for performing work, a condensor and a pump;
   a heating system connected to said pre-heater in parallel to said vapor circuit, said heating system including at least one heat consuming means having an outlet connected to a branch point in said vapor circuit upstream of said pre-heater to deliver working medium thereto; and
   a mixer having a first inlet for receiving working medium from said vapor circuit upstream of said pre-heater and downstream of said branch point, a second inlet for receiving working medium from said pre-heater, a first outlet for discharging working medium to said heating system and a second outlet for discharging working medium to said evaporator.

7. An apparatus for extracting waste heat from a heat vehicle medium, said apparatus comprising
   a heat exchanger for conveying a flow of the heat vehicle medium therethrough;
   a vapor circuit for passing a flow of a working medium into heat exchange with the heat vehicle medium in said heat exchanger, said circuit including a pre-heater, an evaporator and a superheater connected in series in said heat exchanger relative to the flow of working medium, a turbine for performing work, a condensor, a pump, and a separator connected between said evaporator and said superheater to separate vapor from liquid and connected to a branch point upstream of said preheater to deliver separated working medium thereto; and
   a heating system connected to said pre-heater in parallel to said vapor circuit, said heating system including a heat consuming means.

* * * * *